United States Patent [19]

Buschle

[11] Patent Number: 5,399,004
[45] Date of Patent: Mar. 21, 1995

[54] STORAGE SYSTEM FOR SUPPORTS SUCH AS CONTAINERS FOR AUDIO AND VIDEO CASSETTES AND DISCS

[76] Inventor: Richard D. Buschle, Rua Sacopa, 109 apto. 901, Rio de Janeiro, Brazil

[21] Appl. No.: 159,780

[22] Filed: Dec. 2, 1993

Related U.S. Application Data

[63] Continuation of Ser. No. 838,201, Mar. 5, 1992, abandoned.

[30] Foreign Application Priority Data

Sep. 12, 1989 [BR] Brazil .................. 8904598

[51] Int. Cl.$^6$ ........................ B65D 85/672
[52] U.S. Cl. ................... 312/9.63; 312/9.48; 312/319.1
[58] Field of Search .......... 312/9.9, 9.11, 9.16, 312/9.47, 9.48, 9.53, 9.54, 9.55, 9.56, 9.57, 9.63, 9.64, 319.1, 111; 206/387, 444, 504, 509, 511; 220/23.4, 23.6

[56] References Cited

U.S. PATENT DOCUMENTS

| | | |
|---|---|---|
| 3,635,350 | 1/1972 | Wolf . |
| 3,955,681 | 5/1976 | DeZinno ............... 206/511 X |
| 3,995,921 | 12/1976 | Ackeret . |
| 4,087,138 | 5/1978 | McRae ................. 312/9.22 |
| 4,162,112 | 7/1979 | Konkler ............... 206/387 X |
| 4,426,056 | 1/1984 | Gelardi et al. ........ 220/23.4 X |
| 4,523,680 | 6/1985 | Saito et al. .......... 312/9.58 X |
| 4,549,775 | 10/1985 | Carter ............... 312/9.63 |
| 4,819,802 | 4/1989 | Gutierrez ............ 312/9.57 X |
| 4,993,558 | 2/1991 | Assael .............. 312/9.48 X |

FOREIGN PATENT DOCUMENTS

| | | |
|---|---|---|
| 1092062 | 12/1980 | Canada . |
| 333271 | 9/1989 | European Pat. Off. . |
| 2274106 | 1/1976 | France . |
| 2427103 | 12/1975 | Germany . |
| 2622958 | 8/1977 | Germany . |
| 8810769 | 1/1989 | Germany . |
| 1459451 | 12/1976 | United Kingdom . |

Primary Examiner—Brian K. Green
Attorney, Agent, or Firm—Beveridge, DeGrandi, Weilacher & Young

[57] ABSTRACT

A housing has an opening for receiving supports for audio or video cassettes or discs. When the support is fully inserted in the housing, an elastic bias member in the housing exerts a force on the support in a direction which is substantially transverse to the insertion direction. The elastic bias member yields in response to manual pressure on the support which turns the support through an angle in a first rotational direction to a pivoted position. When the support is in its pivoted position, the elastic bias member moves the support to an ejection position while rotating the support in a second rotational direction which is opposite to the first rotational direction. A plurality of housing modules with such elastic bias members are connected together by snap connectors for storing a plurality of supports for recording media.

10 Claims, 11 Drawing Sheets

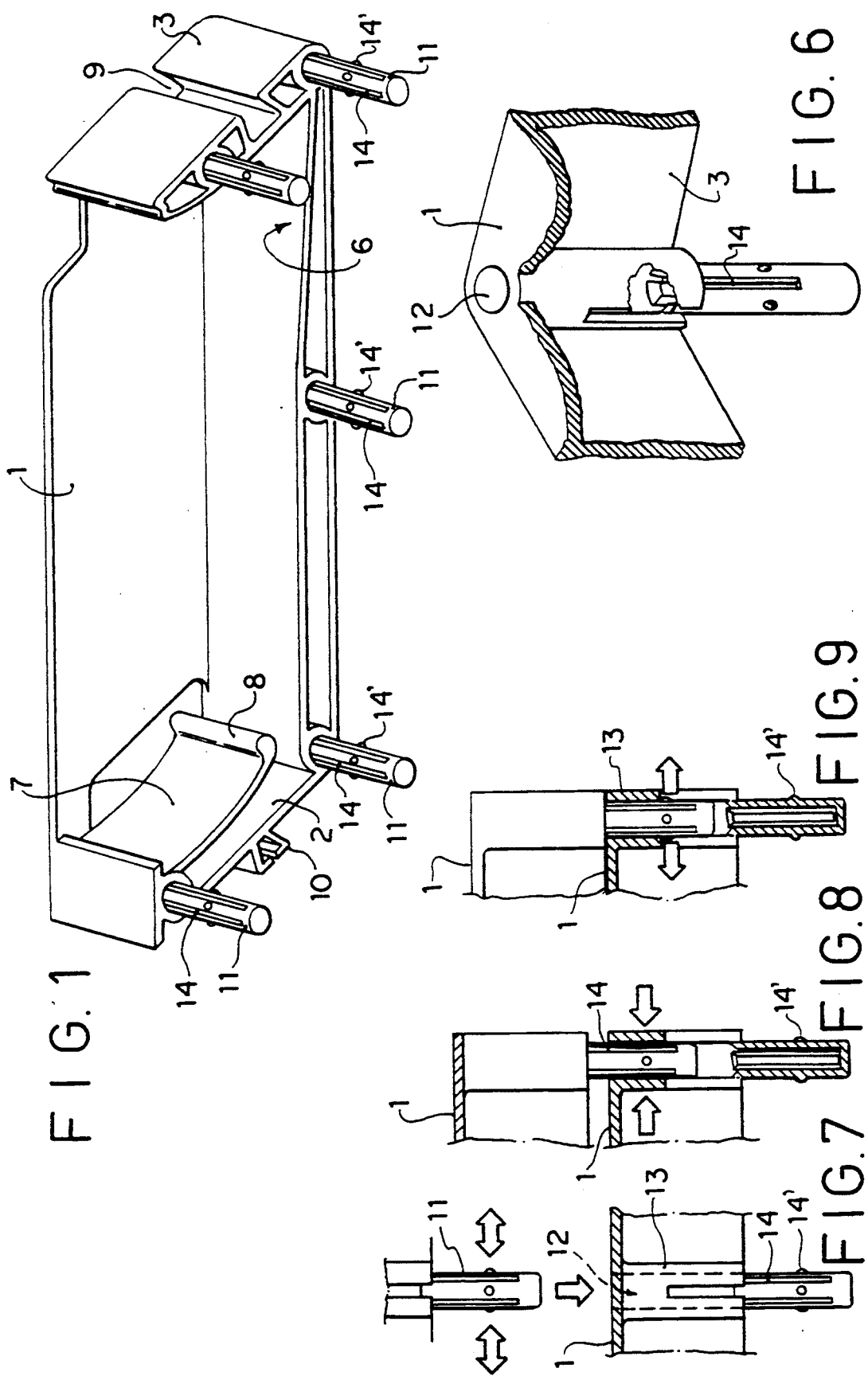

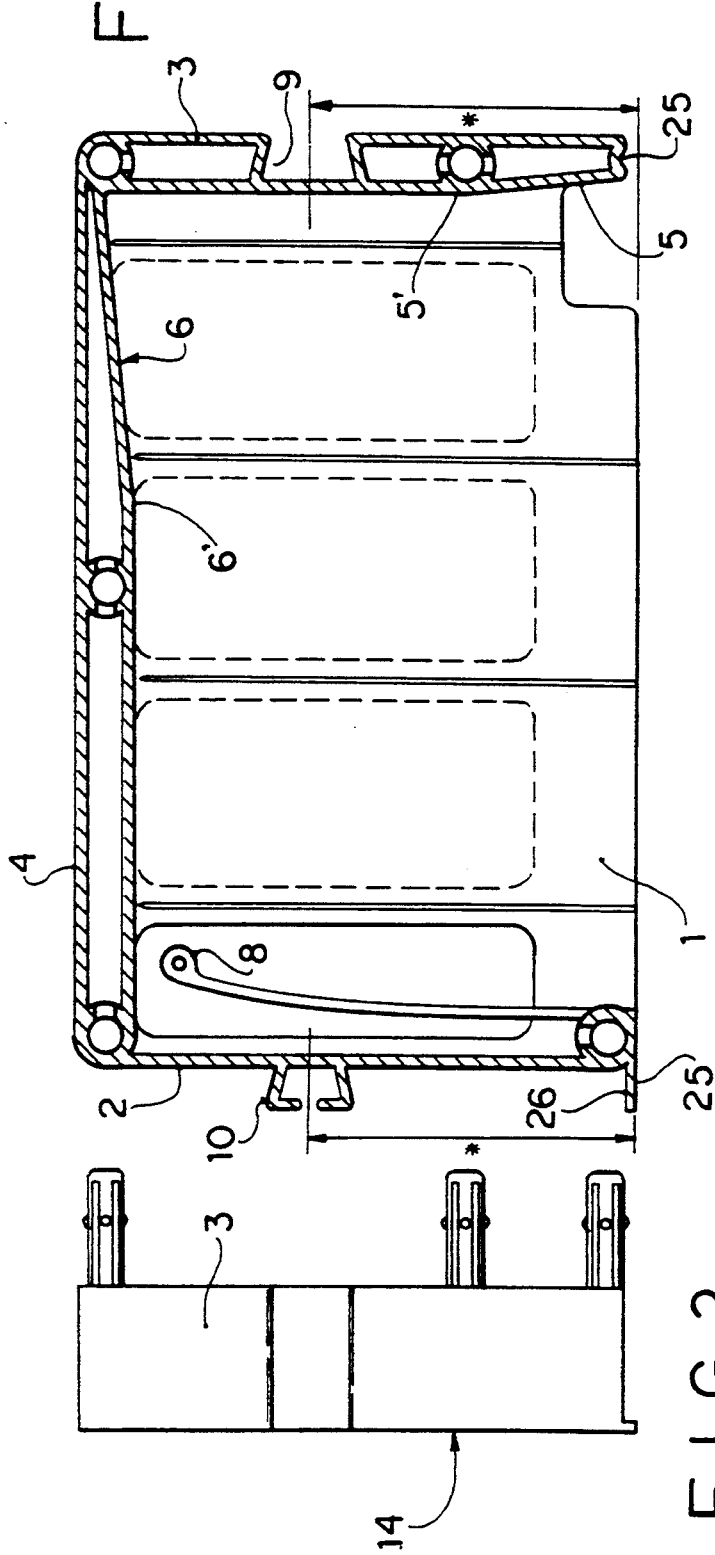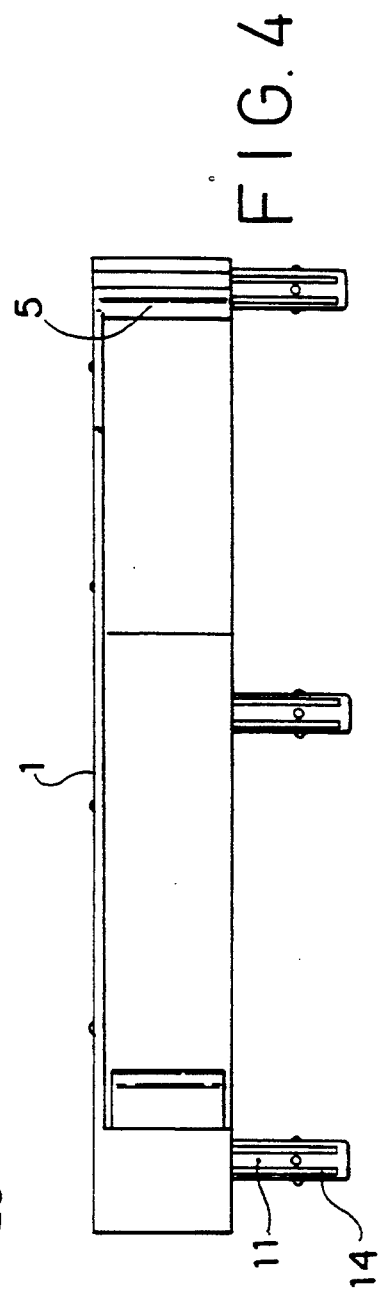

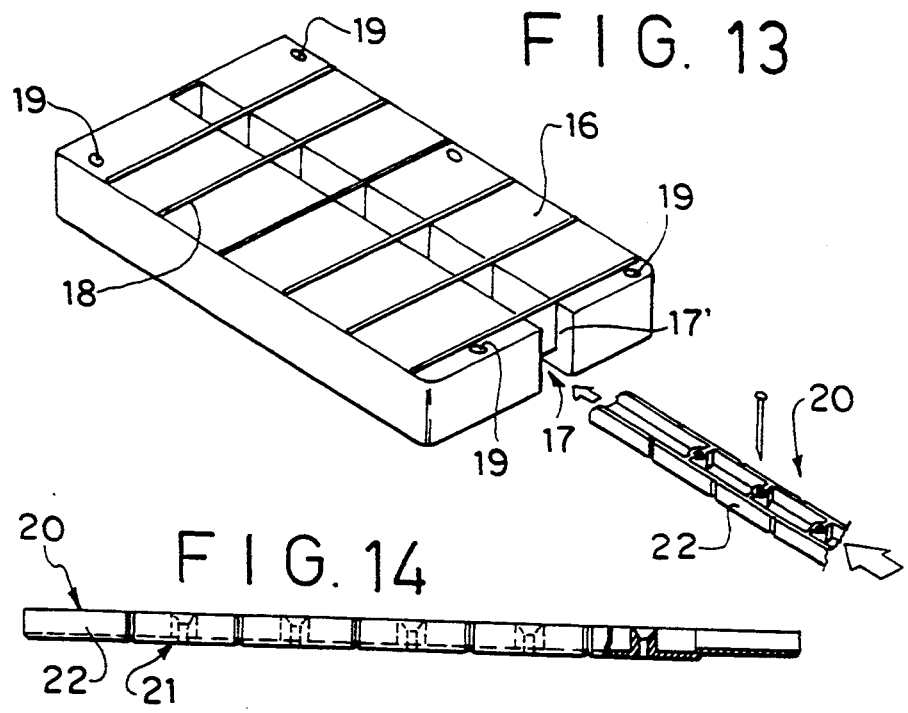
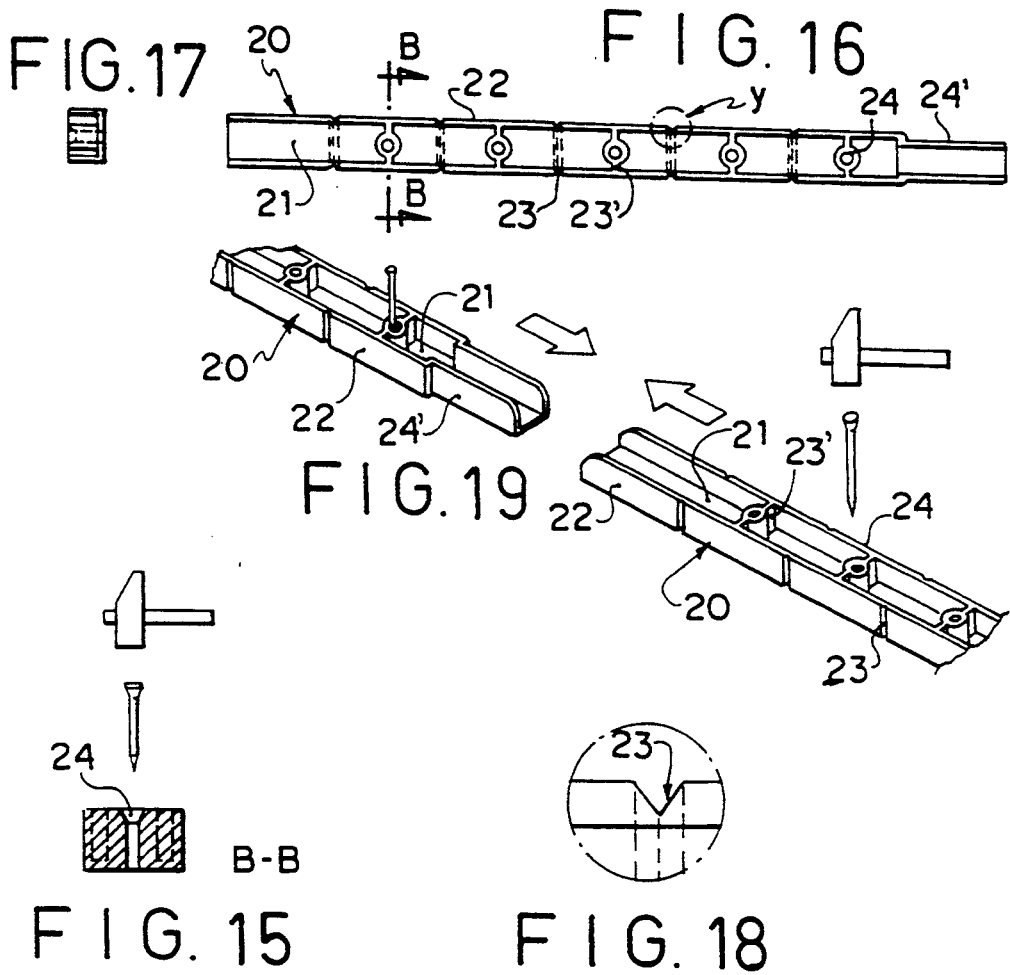

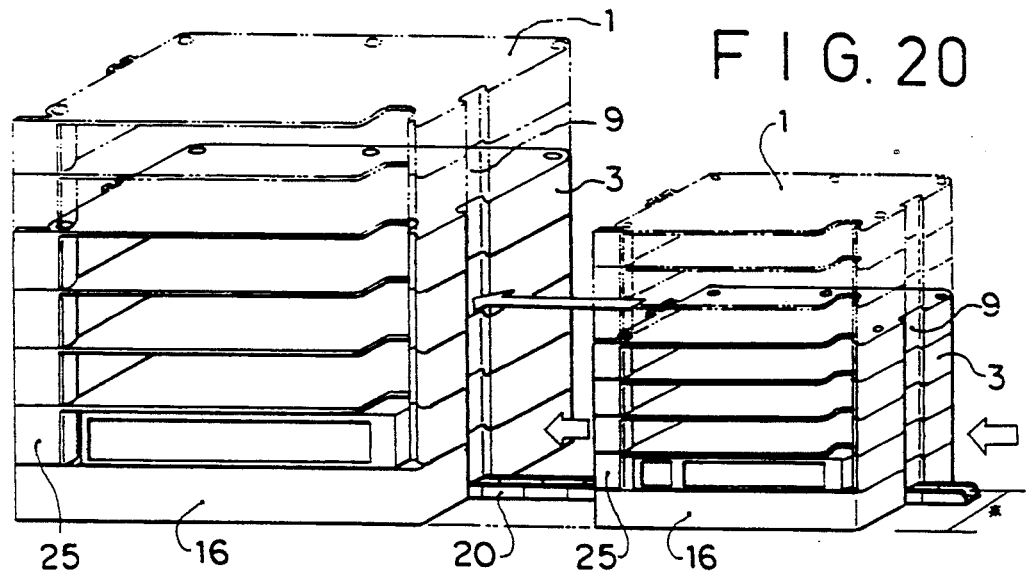
FIG. 20
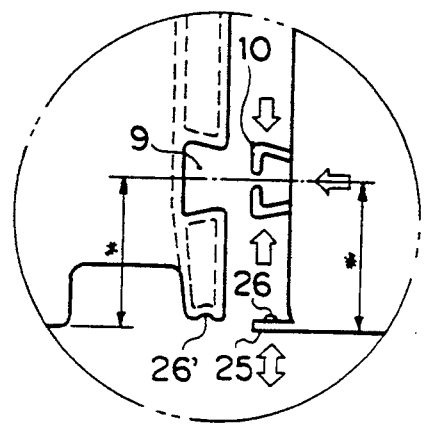
FIG. 21
FIG. 22
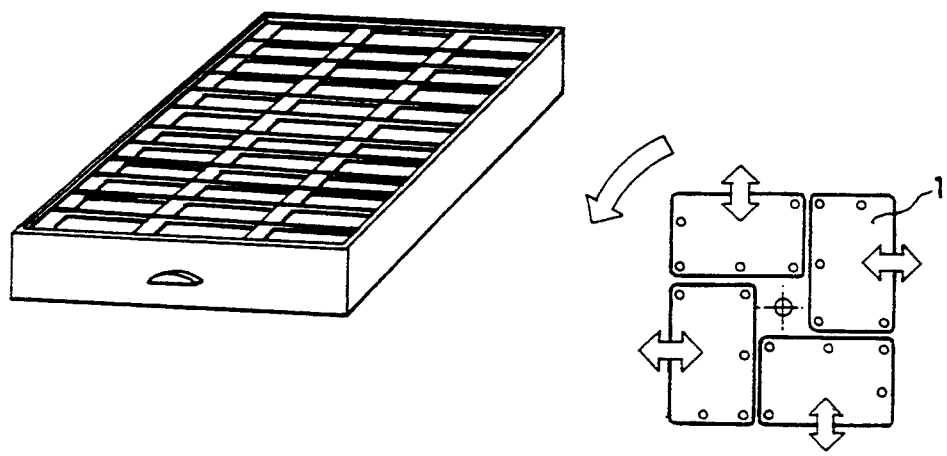
FIG. 25

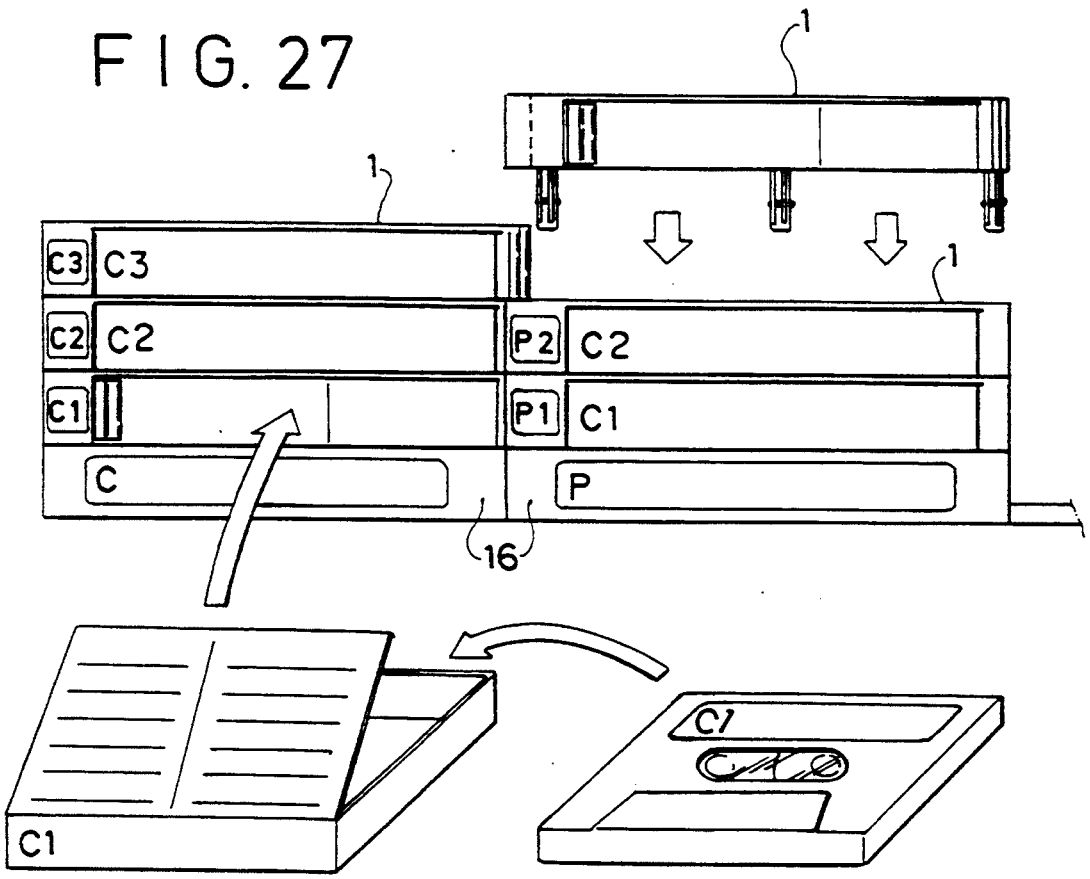
FIG. 27
FIG. 28　　FIG. 29
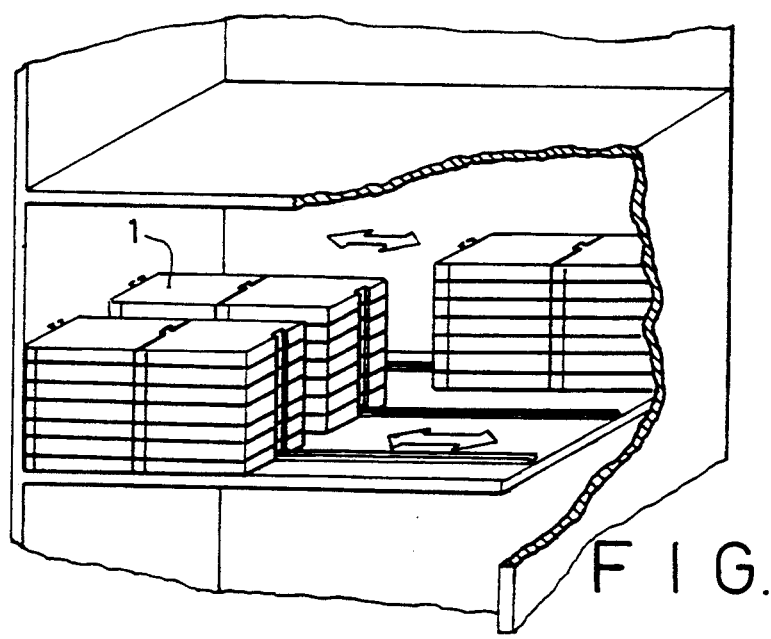
FIG. 30

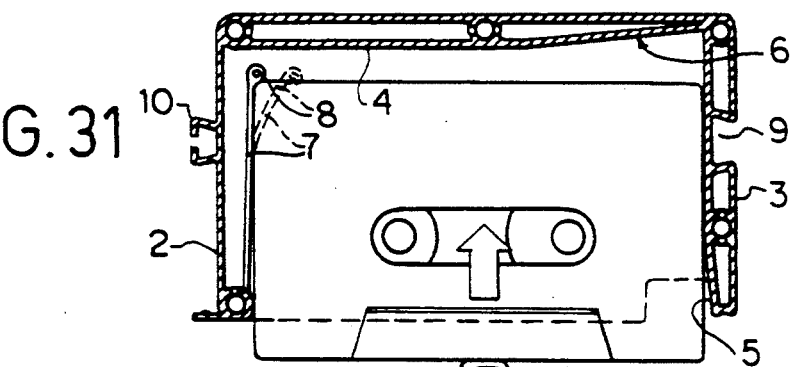
FIG. 31
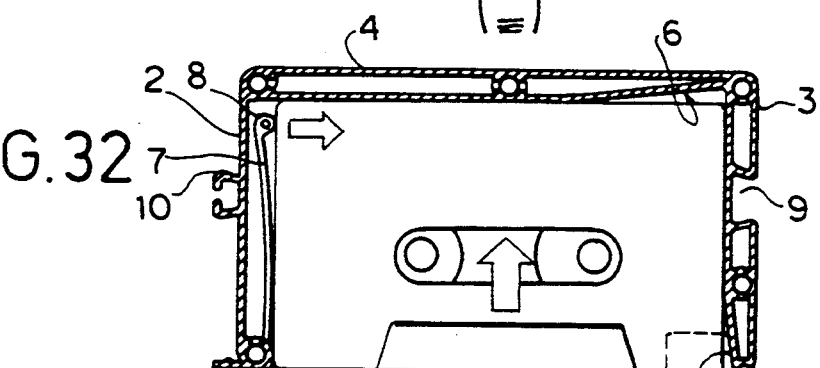
FIG. 32
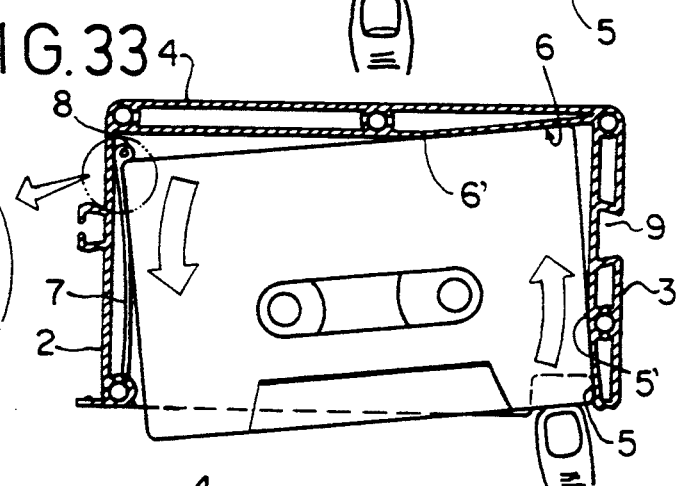
FIG. 33
FIG. 35
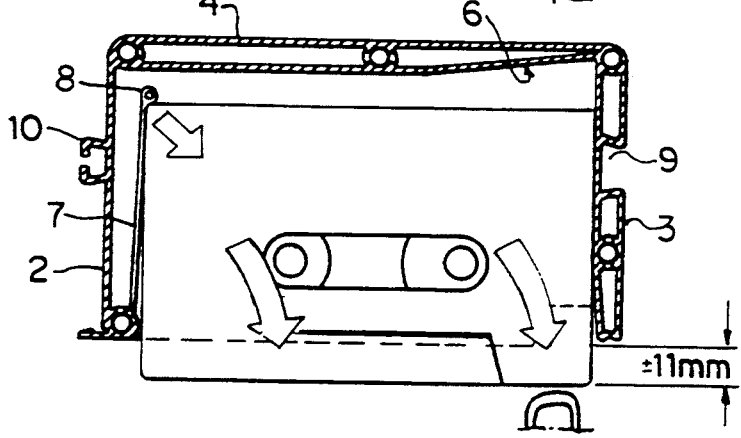
FIG. 34

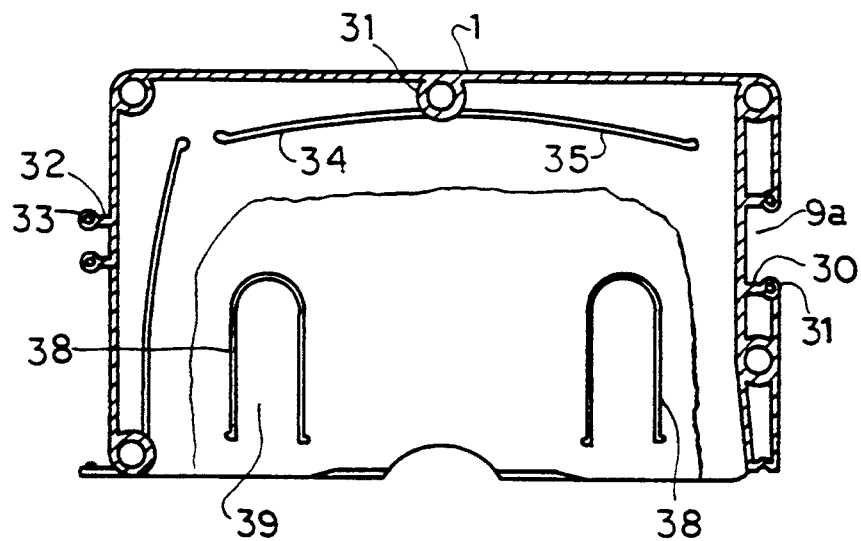
F I G. 42
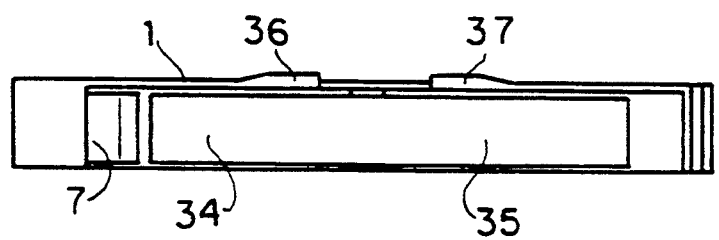
F I G. 43
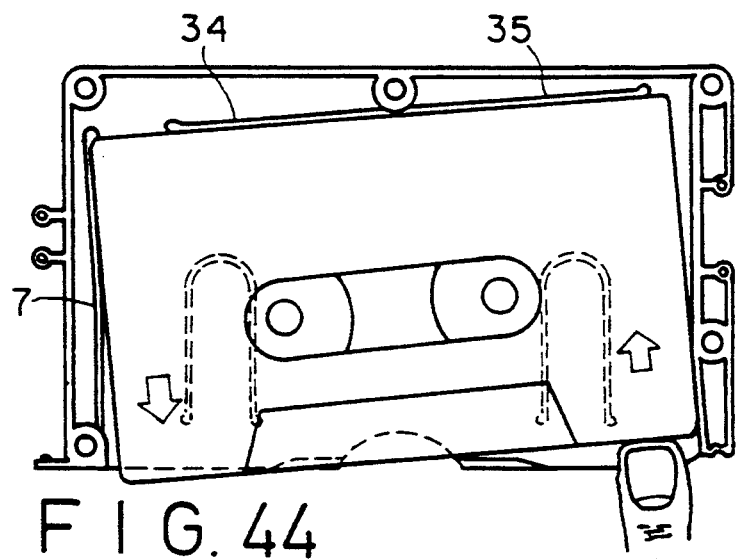
F I G. 44

STORAGE SYSTEM FOR SUPPORTS SUCH AS CONTAINERS FOR AUDIO AND VIDEO CASSETTES AND DISCS

This application is a continuation of application Ser. No. 07/838,201, filed Mar. 5, 1992, now abandoned.

The present invention refers to a housing for storing a recording support such as a magnetic tape cassette, laser disc or the like, and preferably to a housing module of this type so formed as to permit modules to be stacked on top of each other as well as to be connected laterally so as to provide a multi module store for cassettes and the like.

For the purpose of the present specification the word "cassette" will be used in a broad sense to include conventional cassettes on their own, cassettes in their protecting containers, laser disc containers and so on. Naturally, magnetic tape cassettes include both audio and video cassettes.

DESCRIPTION OF THE RELATED ART

Many types of housings for cassettes are known, usually for use in automobiles. In this latter case, they are normally designed to receive the cassettes without their standardized protecting containers whereby they have to provide a certain guarantee against the entry of dust and resistance to fibres and other external influences. Such housings basically comprise a hollow brick shaped body having at least one larger area panel corresponding to the top or bottom of the housing and three narrow upstanding walls fixed to the panel, two parallel side walls defining an opening for the insertion/ejection of the cassette.

Many such housings are provided with a drawer which may enter or exit the housing through the insertion/ejection opening. The magnetic tape cassette is received in the drawer without its protective container. The drawer is under the influence of a metal spring or complex ejection mechanism which may be actuated by a trigger such as a button for automatic opening of the drawer to give the user access to the cassette. These housings are of extremely complex construction in terms of manufacturing techniques since they require complicated ejection systems comprising various parts that have to be mounted inside or alongside the housing itself. Apart from this, they are expensive since to the cost of the components one has to add high production costs due to the essential minimum manufacturing tolerances.

Housings having means for connection to each other are also known in the art but they generally have the following disadvantages:

known housing systems are designed only for use in the home or only for use in an automobile;

housing systems are known which only serve for a given type of cassette, for example, magnetic tapes or laser discs, and they cannot be coupled to other housing combinations for other cassette types, such as video cassettes, for forming a comprehensive store. This is an obvious problem in view of the growing diversity of types of cassettes presently available on the market;

known housings of the same type that may be coupled to each other have to have coupling elements on the large surface areas and such elements are usually formed to provide dovetail type connections which means that such surfaces have to be of considerable thickness and that they have to be relatively thick to permit the connection which is effected by insertion until the correct alignment configuration is reached. Consequently, these housings can only be connected in the direction of their width and height and cannot be accommodated in bigger spaces such as on a shelf or in a cupboard;

the known housings also fail to permit one easily to identify the programme or contents of the cassettes contained therein since they are stored without their protective containers which have to be kept elsewhere or even thrown away. This represents an unjustifiable waste since the protective containers obviously represent part of the total cost of the cassette.

OS DE 2742348, for example, discusses a combination of a programme identification label together with the housing. The disadvantage of this system is that the labels cannot be seen after various cassettes have been piled on top of each other.

OS DE 3202204 discloses an example of a special cassette container which is different from the standard container. Up to a certain point it may be piled, and has an identification arrangement similar to that of the standardized container but it does not combine with other existing systems due to its different dimensions and it cannot be used with other types of cassettes.

OS DE 2427103 and OS DE 2719783 refer to coupleable housings from which the cassettes may be withdrawn after opening the front cover. Both systems are expensive from a manufacturing point of view and piling is limited. Furthermore, the standardized cassette container once more cannot be used with the result that there is no programme identification.

U.S. Pat. No. 4,549,775 discloses a housing for cassettes and the like arranged for partial rotation of the cassette about a pivot point at the back of the housing. A parallel ejection spring is actuated on pressing inwardly one corner of the cassette. When the cassette is fully inserted in the housing the spring applies a transverse force against the cassette to press it against an opposite side of the housing to maintain it in place. On pressing the opposite front corner of the cassette inwardly, the cassette pivots or rotates about the pivot point until a corner thereof passes in front of the spring which then increases the rotational force applied by the finger and ejects the cassette. This system involves a continuous rotational or tilting movement of the cassette that is initiated with finger pressure and, as tilting increases, completed by the force of the spring. If ejection of the cassette is attempted merely by pressing in the cassette to initiate the titling movement and only one hand is used, the spring produces a catapult effect and there is a danger of the cassette being ejected and falling on the ground.

In view of the above, the large majority of existing housings present the above mentioned disadvantages which are often greater than the advantages they offer.

An object of the present invention is to provide a housing of the above type having a much simpler and secure insertion/ejection mechanism than traditional systems. Preferably the simultaneous formation of a store for different types of presently commercialized cassettes is permitted and the housing is adapted for use both in the home and in vehicles as well as being suitable in commerce as a display.

In addition the housing of this invention has an extremely reduced manufacturing cost due to its simplicity even though it may meet requirements regarding protection against dust and vibrations when used in vehicles, and it may also permit visual identification of its contents.

It is also an object of the invention to provide a housing module which eliminates the disadvantages of known housings in that it may be coupled to other modules in a simple manner so as to facilitate the formation by the user of a comprehensive file. Due to its varying possibilities of the arrangement of the housing compartments of different modules, it permits one to make the best possible use of the space available.

SUMMARY OF THE INVENTION

According to the present invention a housing for storing a recording support such as a magnetic tape cassette, laser disc or the like, having an opening for the insertion and ejection of said support and defining an insertion direction, a pivot point for said support within said housing and opposite said opening and first elastic bias means arranged in said housing on a first side of said opening, which apply to said support, when fully inserted in said housing, a force substantially transverse to said insertion direction and towards the opposite side of said opening and, when manual pressure in the insertion direction is applied to said support at a point adjacent to said opposite side of said opening, said support is pivoted against the bias of said first elastic bias means in a first rotational direction to an ejection position in which said first elastic bias means apply to said support a force having a component in an ejection direction opposite said insertion direction, is characterized in that said first elastic bias means has a configuration such that, when said support reaches said ejection position, said ejection force tends to rotate said support in a second rotational direction opposite said first rotational direction.

Preferably, the above mentioned elastic bias means comprises a spring fixed to said housing at said first side of said opening and including a spring blade portion directed substantially in said insertion direction, said spring blade portion having a free end provided with a protuberance adapted to cooperate behind said support when in said ejection position to provide said force component in the ejection direction.

The spring blade may be advantageously formed as an integral part of the housing, the whole being able to be a single part moulded from plastic material. This greatly reduces the final costs.

The fact that, in the preferred embodiments, special steel springs and drawers are not necessary is an obvious advantage as regards manufacturing simplicity and costs. Metal springs are difficult to mount. Compared with traditional systems both material and labour costs are drastically reduced.

In contrast to known housings in which the cassette is introduced without its protective container, the housing of the present invention-may be adapted to receive the cassette together with its container. This automatically simplifies or facilitates identification of the programme of the cassette by the user since the longitudinal narrow face of the standard cassette container always carries an indication of the programme and this will always be visible through the insertion/ejection opening of the housing.

The housing of the present invention preferably comprises a module attachable to another similar module, said module comprising a panel of larger area and upstanding therefrom, first and second side walls and a back wall contiguous with first ends of said side walls, said module being a single part of moulded plastics material and further being formed with first means for permitting connection to a similar module, the panel of said similar module serving to complete a cavity for receiving said container defined by said two panels, said first and second side walls and said back walls. In addition, the module may be provided with second means for permitting lateral connection to similar modules. The embodiments described later and illustrated in the accompanying drawings show preferred and advantageous intermodule connecting arrangements.

The housing modules according to the preferred embodiment of the present invention may be coupled in any desired direction, in particular taking advantage of the depth of the available space. Furthermore, housing modules may be coupled in side to side relation with other housing modules for different types of cassettes. Piling is possible both along the shorter and longer edges, that is to say, with the cassettes standing up or lying down so that cassette manufacturer recommendations may be respected. Thus, housing modules for video cassette containers may be grouped together and coupled to different sized modules for other cassettes, laser discs and so on.

BRIEF DESCRIPTION OF THE DRAWINGS

The present invention will now be described in greater detail, by way of example, with reference to the accompanying drawings, in which:

FIG. 1 is a bottom perspective view of a first embodiment of a housing module constructed according to the present invention;

FIG. 2 is a horizontal longitudinal cross section of the housing module shown in FIG. 1;

FIG. 3 side elevation of the same module;

FIG. 4 elevation of the same module;

FIG. 6 is a perspective detail of one of the connecting or coupling means used in the modular housing;

FIGS. 7, 8 and 9 are views, partly in section, of the connection or coupling means when piling one housing module onto another;

FIG. 13 is a perspective view of a rail arrangement for fixture to a surface and suitable for slidable mounting of the base thereon;

FIGS. 14 and 15 are lateral and sectional views respectively of the rail shown in FIG. 13;

FIG. 16 is a top view of the rail;

FIGS. 17 and 18 comprise a section along line B—B and a detail, respectively, of a weakening point in the rail of FIGS. 13 to 16;

FIG. 19 is a perspective view of two rail portions that may be fitted together in the direction of the arrows shown therein;

FIG. 20 is a perspective view showing the possibility of connecting two groups of housing modules for different types of cassettes and which may be effected with or without the rail;

FIG. 21 is detail in plan of the connection of adjacent housing modules;

FIG. 22 is a perspective view showing the possibility of accommodating a group of housings according to the invention in a drawer;

FIG. 25 is a top view of another possibility of coupling housing modules according to the present invention;

FIGS. 27, 28 and 29 show the possibility of providing triple identification between the cassette, its container and its respective module in a given group of housing modules;

FIG. 30 is a perspective view showing various possibilities of mounting on rails different groups of housing modules in a third dimension within a closed compartment;

FIGS. 31 to 34 are sectional views of the first embodiment shown FIG. 1, illustrating the sequence of insertion and ejection of a cassette;

FIG. 35 is detail of the co-operation between the first elastic means and the cassette shortly before ejection;

FIG. 42 is a plan view, particularly in section, of a further embodiment of housing module according to the invention;

FIG. 43 is a front elevation of the module of FIG. 42;

FIG. 44 is a view similar to that of FIG. 42 but showing a cassette at the time of ejection;

DESCRIPTION OF THE PREFERRED EMBODIMENT

Figure 5:
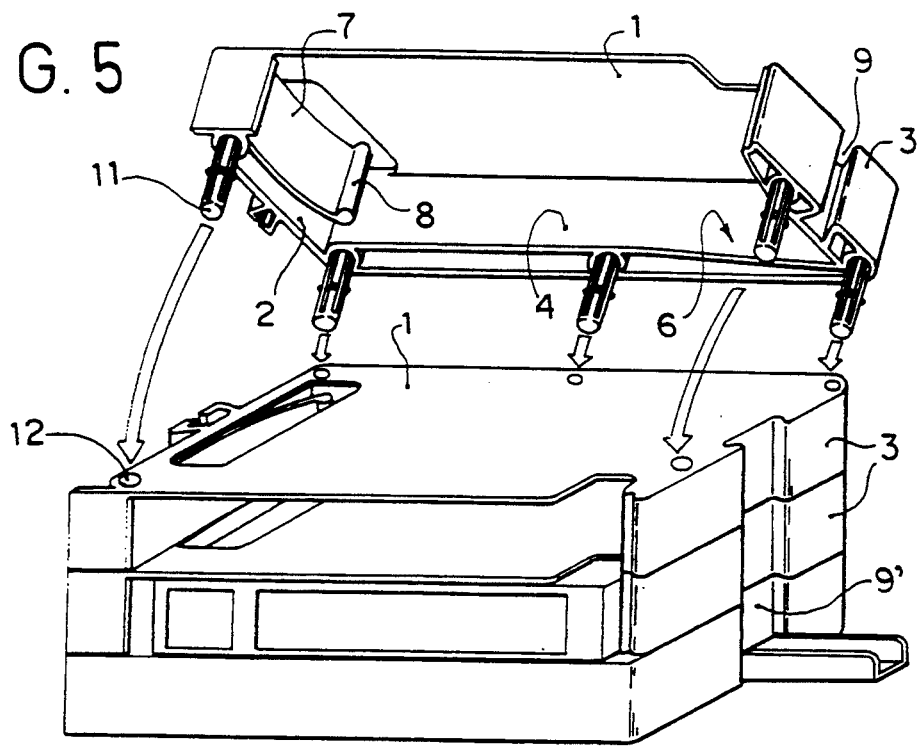
FIG. 5 is a front perspective view showing two modules of FIG. 1 mounted on a base and a third module being piled thereon.

Referring now to the drawings, FIGS. 1 to 3 show first embodiment of a housing module according to the invention. It consists basically of a hollow substantially brick shaped open box having a large area panel 1, a side wall 2, a double side wall 3 and a longitudinal double back wall 4. Walls 2, 3 and 4 are upstanding or normal to panel 1. Walls 2 and 3 are substantially parallel to each other and to a cassette insertion direction indicated by the arrow in FIG. 2. Wall 3, however, is thinned at its end remote from back wall 4 to form a ramp, the point where the ramp commences defining a cassette pivot point 5' so that the cassette insertion/ejection opening defined between the free ends of side walls 2 and 3 is slightly wider than the distance of the parallel portions of these walls.

Back wall 4 is also narrowed to form a ramp 6 at its end that meets side wall 3, ramp 6 being inclined backwardly away from the cassette insertion/ejection opening. The point where ramp 6 meets the rest of wall 4 defines another cassette pivot point 6'. Ramps 5 and 6 are substantially at an angle of 909 with respect to each other.

Integrally moulded with the free end of side wall 2 is a spring element 7 in the form of a blade which projects backwardly in a direction generally parallel to wall 2 but is curved away therefrom and terminates in a rounded inwardly directed protuburence 8. Side walls 2 and 3 are provided with lateral coupling means in the form of a cavity 9 in double wall 3, approximately centrally thereof, having a relatively narrow opening and expanding to a planar bottom portion in wall 3. Side wall 2 is correspondingly formed with coupling means in the form of two hook shaped projections 10 which are inclined outwardly away from each other at an angle that corresponds to the inclination of the side walls of cavity 9. The hook portions of projections 10 are planar and are aligned with each other for abutment against the bottom of cavity 9 of a second module being coupled thereto. Furthermore, the free end of wall 2 adjacent to the cassette opening is formed with a front flange portion 25 in a plane slightly displaced from the plane that contains the free end of wall 3 and consequently ramp 5. This free end of wall 3 is formed with a small cavity 26' which co-operates with a small protuberance 26 on flange 25 of an adjoining module when coupling is effected.

The complete module is preferably moulded as a single part of plastics material and it will be understood that due to the elasticity of projections 10 and flange 25 two modules may be snap fitted to each other.

Vertical coupling between modules may be effected due to second coupling or connection means in the form of pins 11 which are moulded integrally with or separately from the rest of the module and are distributed at various points along walls 2, 3 and 4. In the case being described there are five coupling pins 11, two of which are positioned at the junctions of walls 2 and 3 with back wall 4 so as to ensure stability of the pile when various modules are stacked onto each other.

As can be seen from FIGS. 5 and 6, panel 1 is formed with holes aligned with coupling pins 11, such holes being defined by cylindrical portions 13 having lengths corresponding to the heights of walls 2, 3 and 4. The lower end of each cylindrical portion 13 is provided with or has fixed thereto pins 11. Orifices 12 and the inner bore of cylindrical portions 14 have a diameter suitable for receiving the coupling pins 11 of another module (see FIG. 8).

Pins 11 are hollow and are longitudinally split by slots 14 along part of their length. A stop means or protuberance 14' is formed between each pair of slots 14 for co-operation with the inner surface of a corresponding cylindrical portion 13 of another module.

FIGS. 7 to 9 show the vertical stacking procedure in which coupling pins 11 of one module are compressed as they pass through orifices 12 in the module immediately therebelow, the edge of each orifice 12 being slightly rounded to facilitate insertion. The resiliency of the cylindrical wall of pins 11 provided by longitudinal slots 14 permits the pin to be compressed and to expand as indicated by the arrows in FIG. 7 so that the pin may penetrate the cylindrical portion 13 under compression due to the stop means 14', as shown in FIG. 8, until they reach slots 15 in the cylindrical portion 13. This alleviates the compression imposed by stop means 14' and permits radial expansion of coupling pin 11 with the stop means 14' penetrating the slots 15 with a characteristic click to indicate to the user that the desired coupling shown in FIG. 9 has been completed.

Obviously stop means 14' and slots 15 could be by other means to fix pins 11 in cylindrical portions 13.

As can be seen particularly from FIG. 5, when stacking one module on to another, the large area panel 1 of the lower module will form the base for the upper module so as to complete the definition of the cassette insertion/ejection opening. Panel 1 can be provided with moulded ribs on its upper face, directed in the insertion direction, so as to reduce sliding friction when a cassette is inserted or rejected.

Figure 12:
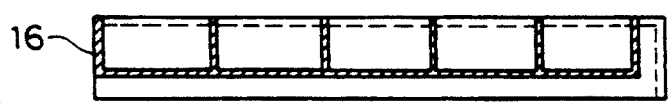
FIGS. 11 and 12 are cross sectional views taken along line A—A and B—B, respectively, of the housing base shown in FIG. 10.
Figure 11:
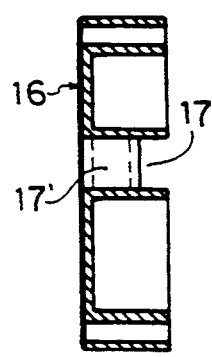
Figure 10:
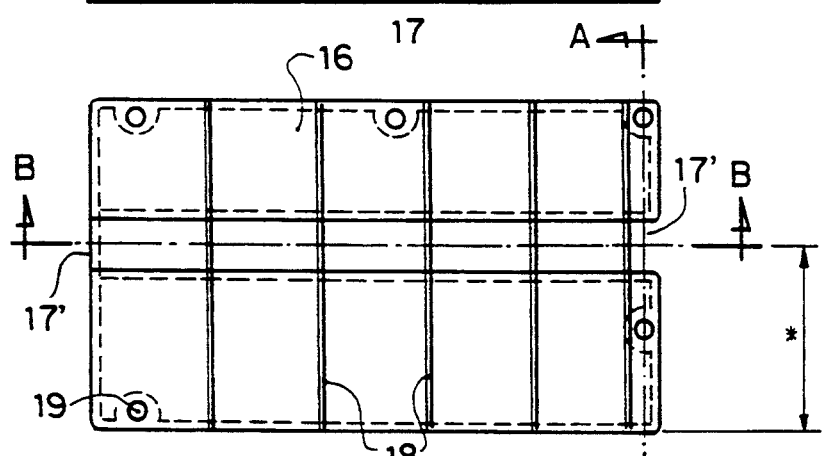
FIG. 10 is a top view of the base shown in FIG. 5.

FIGS. 10, 11 and 12 show a base 16 suitable for mounting or fixing a first lower-most housing module. The base is in the form of a rectangular block which corresponds to the size of the module to be placed therein. It is formed with a longitudinal passage 17 running along its complete length as well as with a series of parallel and uniformly spaced transverse ribs 18 which serve to reduce friction on insertion of a cassette into the lower-most module. Base 16 is also formed with a cavity 17' corresponding to cavities 9 in the housing modules. The upper face of base 16 is formed with cylindrical holes 19 for co-operation with the coupling pins 11 of the housing module to be mounted thereon.

In order to fix base 16 to a separate surface, for example, a shelf or the bottom of any given compartment, a fixing rail 20 is provided. The rail has a bottom surface 21 and two longitudinal walls 22 arranged perpendicularly thereto so as to fit precisely into passage 17 of base 16. Rail 20 may be fixed to the support surface by means of an adhesive tape or the like or, as illustrated, it may have holes 24 distributed along its length so that it may be fixed to the surface by nails or screws.

Reinforcement ribs 23" are also provided between longitudinal walls 22. Rail 20 may be moulded from plastics material to have a narrowed end 24' so as to be received between longitudinal walls 24 at the other end of a further rail section. This permits the addition of further bases when increasing the store.

The longitudinal walls of rails 20 may also be formed with channels grooves 23 at given intervals along their lengths, as can be seen in FIGS. 18 and 19. Such grooves serve to weaken the rail which may then be broken to adapt its length to that of a compartment, for example, as shown in FIG. 30.

FIG. 20 shows how two piles of housing modules for different types of cassettes may be coupled together. Two bases 16 are shown to be placed over a fixing rail 20, each base having mounted thereon a respective pile of housing modules according to the invention. The left hand base 16 is specifically for video tapes whereas the right hand base carries housings for standard music cassettes. Although the cassette containers for the two types are of different sizes, the respective housing modules are provided with identical coupling means (cavities 9 and projections 10) so that lateral coupling may be effected. It will also be seen that notwithstanding the compact storage system, the indications of the contents of the cassette containers are readily visible.

Although the two piles are shown separately, they may be slid towards each other along rail 20 to effect the snap coupling action between cavities 9 and projections 10. Naturally such coupling can also be effected in the absence of rail 20.

FIG. 21 shows more clearly how flange 25 formed beside the cassette opening serves as a means for supporting and reinforcing coupling between adjacent housing modules. As already mentioned, with respect to FIG. 2, protuberance 26 on flange 25 snap fits into corresponding reentrance 26' at the free end of ramp 5 of the next module.

FIG. 22 shows how various housing modules may be arranged in a drawer with the cassette insertion/ejection openings upwardly so as to permit the user to identify the contents of facing the cassettes rapidly, particularly because the cassettes themselves are in their protective containers clearly showing the identity of their contents.

Figure 23:
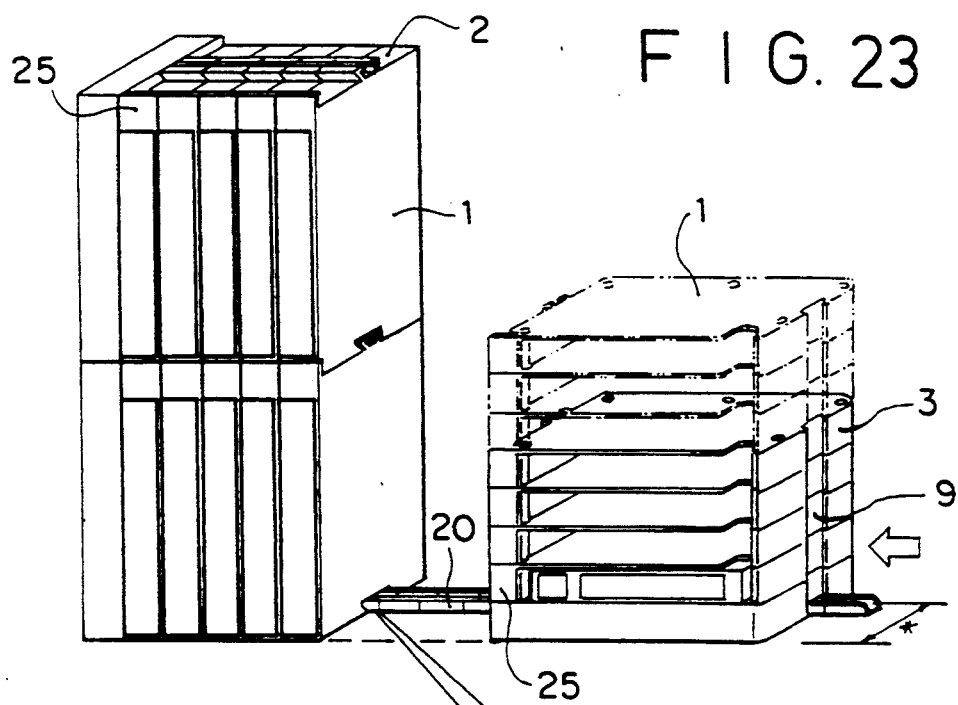
FIG. 23 is a perspective view similar to that of FIG. 20, showing another possibility of connecting housings according to the invention, in accordance with the recommendations of certain tape manufacturers.
Figure 24:
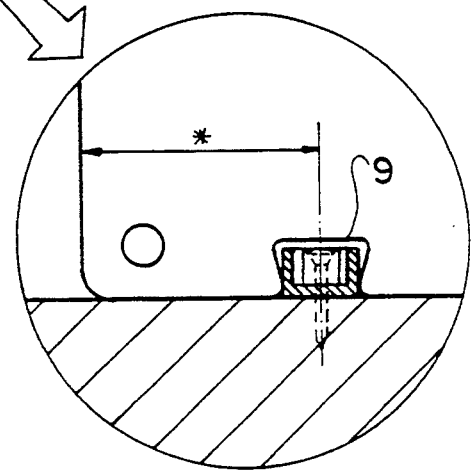
FIG. 24 is a detail of a second use of the housing profile as a guide for the rail.

FIG. 23 shows how a pile of modules may be arranged vertically on the fixing rail 20 with rail 20 co-operating with cavities 9. Another pile of modules containing other types of cassettes may also be positioned on the rail next to the first pile. The manner in which the first pile is guided on the rail is shown in FIG. 24. With further reference to FIG. 23, it will be seen that flanges 25 of the modules are provided with labels which are preferably self adhesive, which may be used to carry codes, such as letters, numbers, symbols, colours and the like, related to the contents of the tapes.

Figure 26:
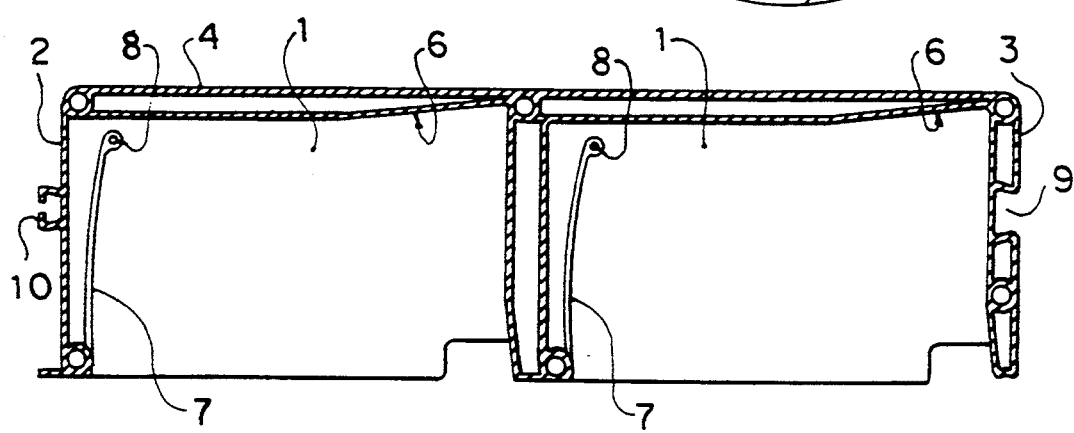
FIG. 26 shows a second embodiment of the housing of the invention, comprising two housings in side to side relation and formed as an integral part to produce a single module.

FIG. 26 shows that various combinations or associations of housing modules according to this invention are possible using a single moulded part. One such possibility is illustrated in the figure. It comprises the association of two modules to form a single housing module that may be moulded as a single part simply on a large scale production line.

FIGS. 27, 28 and 29 also show piles of housing modules coupled in side by side relation, clearly illustrating that both housing modules may carry the same identification by means of adhesive labels, following the principle that is facilitated by the present invention of determining that each cassette has its own place in the store of housing modules. In this manner one can immediately identify a given tape in a position corresponding to the same type of music as also one can immediately see if a tape is missing. The base could also be provided with an identification determining groups of cassettes belonging to the same specific area. Also, the arrangement permits the cassette to be used in a different location from that of the housings, for example, in an automobile, without losing control of its existence.

FIG. 30 shows the possibility of storing various piles of housing types or even types of cassette simultaneously, for example, video and sound tapes, laser disc containers as well as any combinations thereof, advantage being taken of the full depth of a compartment, such as, for example, a shelf in a cupboard.

FIGS. 31 to 34 show the manner of inserting and ejecting a cassette into and from a housing according to the invention.

FIG. 31 shows initial insertion into the housing of, for example, a cassette that may or not be within its protective container. As will immediately be seen, the cassette should be introduced perpendicularly to the insertion/ejection opening, the parallel parts of the inner faces of walls 2 and 3 serving as a guide. As the cassette continues to be inserted, spring element 7 is deflected gradually to a state of maximum deflection until the end protuberance 8 abuts the side of the cassette and forces it to the right in the direction of the arrow shown in FIG. 32 against opposite side wall 3. In this manner the cassette is snugly and firmly held in the housing.

When the user wishes to withdraw the cassette, he should apply a light pressure to the side of the cassette nearest to ramp 5, as indicated by the thumb shown in FIG. 33. The cassette is then tilted about the two pivot points 5' and 6' at the higher ends of ramps 5 and 6, the corresponding wall portions of the cassette lying along those ramps. When this occurs, and as may be seen in FIGS. 33 and 34, the inner left hand corner of the cassette moves forward and the rounded protuberance 8 at the end of spring element 7 snaps around that corner of the cassette and provides it with a force having a component in an ejection direction as may be seen from FIG. 34. The result is partial ejection of the cassette which reaches the configuration shown in FIG. 34. The cassette may then be removed manually.

Figure 36:
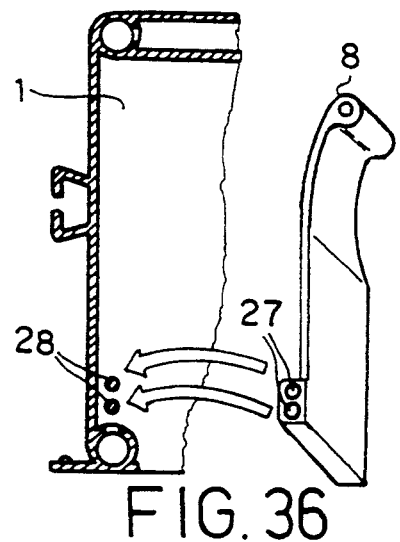
FIGS. 36, 37 and 38 show other examples of the construction of the first elastic means, including the manner of connecting them to the housing of the present invention.

FIG. 36 shows another configuration for the elastic element 7 which in this case is a separate moulded part having a thickened base formed with two parallel holes 27 designed to receive two mounting pins 28 formed on panel 1 of the housing module. Alternatively the base of spring element 7 may be fixed by ultrasound, adhesive or the like.

Figure 37:
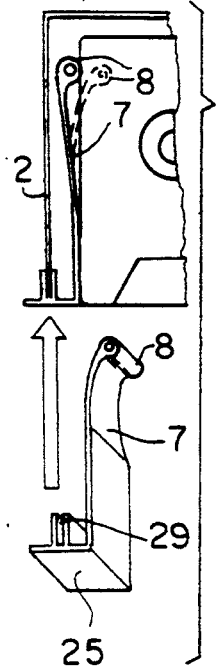
Figure 38:
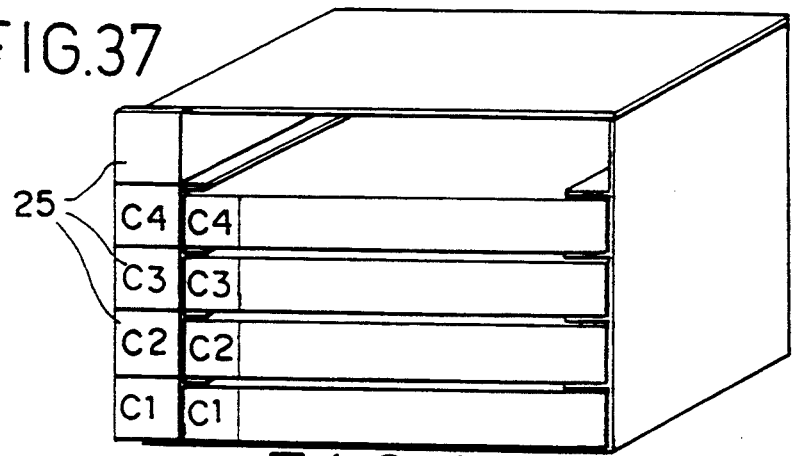

Another possibility is shown in FIG. 37 where spring element 7 is formed as part of the flange 25 of the earlier embodiments, the inner surface of flange 25 being formed with two parallel closely spaced flanges 29 normal to flange 25 and adapted for receiving the free end of the wall 2 of the housing module.

Figure 39:
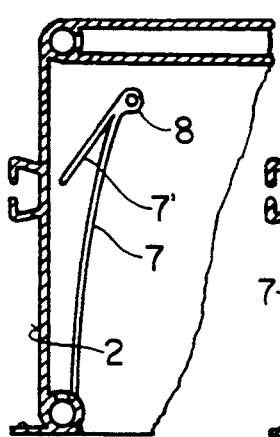
FIGS. 39 and 40 show details of another embodiment of the first elastic means, the former showing the elastic means in their relaxed state and the latter in their state of compression.

FIG. 39 shows the spring portion of spring element 7 provided with an additional elastic element 7' extending backwardly from rounded protuberance 8 in the general direction of side wall 2.

Figure 40:
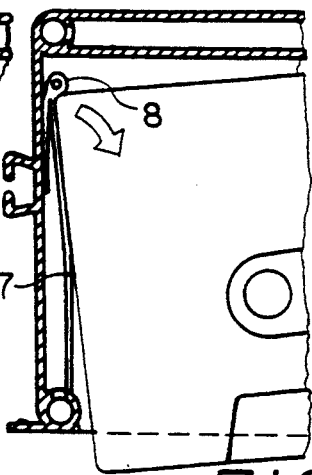

FIG. 40 shows how, on introduction of a cassette, the additional spring element 7' is also compressed so as to increase both the ejection force and the force applied by element 7 to maintain the cassette in the housing.

Figure 41:
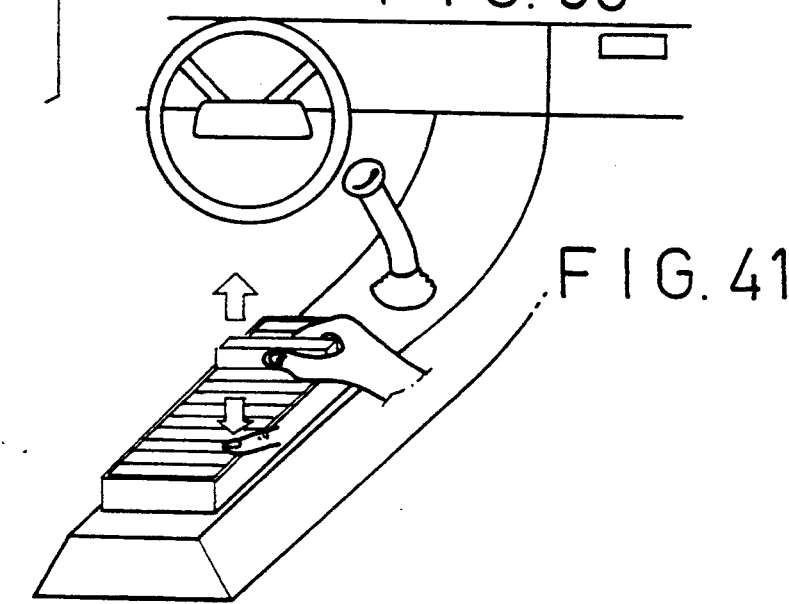
FIG. 41 is a perspective view of a manner of using a recepticle according to the present invention in an automobile.

FIG. 41 shows how housing modules according to the present invention may be used in an automobile. The figure shows that, after ejection of the cassette container, the latter is already in the correct or suitable position for withdrawing the cassette from within its protecting container. In the position shown, this operation of withdrawing the cassette from its container may be done with a single hand, there being no temptation for the motorist to take his other hand off the steering wheel.

FIGS. 42 to 47 illustrate two further embodiments of the invention which incorporate a number of extra and alternative features of an advantageous nature, these including an alternative means of simpler manufacture for the lateral coupling of modules to each other and an arrangement for better preventing accidental ejection of the cassette containers due to violent trepidation of a vehicle.

In each of the embodiments the formations 9 and 10 shown in FIGS. 1 to 41 are substituted on one side of the module by a simpler cavity 9a formed by two vertical parallel ribs 30 terminating externally in rounded protuberances 31 narrowing the opening to the cavity and, on the other side of the module, a pair of similar ribs 32 that are slightly less spaced apart, also terminating in rounded protuberances 33. When joining two modules laterally, protuberances 33 of one module are simply snapped passed the protuberances 31 of the other module to obtain the desired coupling.

Considering now more specifically the embodiment of FIGS. 42 to 44, it will be seen that the housing module shown therein is provided at its back wall with a further spring element comprising two blade parts 34 and 35 extending to each side of the central cylindrical portion 13 forming part of the coupling means of the housing. Both spring element parts 34 and 35 are curved forwardly whereby, on insertion of a cassette, they will both apply a force thereto in an ejection direction.

Notwithstanding the above, spring element parts 34 and 35 do not eject the cassette under normal conditions in view of the presence of two ridges 36 and 37 adjacent the cassette insertion opening and formed along the top front edge of panel 1. Naturally in the housing module shown in FIGS. 32 to 34 the ridges 36 and 37 behind which the cassette lies and against which it is biased by spring element parts 34 and 35, are those formed on panel 1 of the module immediately below since that is the panel that forms the bottom surface of the housing module illustrated.

In addition to the above, panel 1 of the same module is formed with U-shaped slits 38 as shown in FIG. 42 to define downwardly displaced spring blades 39. These spring blades 39 maintain any cassette fully inserted into the housing biased downwardly against the bottom surface of the housing, that is to say, the top panel 1 of the housing module panel 1. This ensures that the force of spring element parts 34 and 35 impels the cassette against ridges 36 and 37. This provides a positive impediment to the cassette being ejected by accident due to trepidation of the vehicle in which the housing may be mounted.

As will be seen from FIG. 43 the outer ends of ridges 36 and 37 are inclined cam surfaces. Consequently when the cassette is to be rejected by applying finger pressure as shown in FIG. 34, the front left hand corner of the cassette rides up the cam surface of ridge 36 which lifts the cassette against the bias force of springs 38, permitting it to be ejected not only by the force of spring element 7, but also by that of spring element parts 34 and 35.

Figure 45:
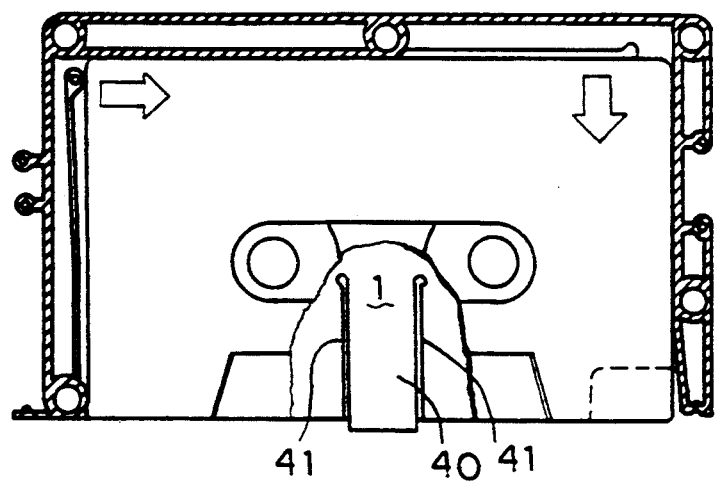
FIG. 45 is a plan view particularly in section of yet a further embodiment of housing module according to the invention with a cassette fully inserted.
Figure 46:
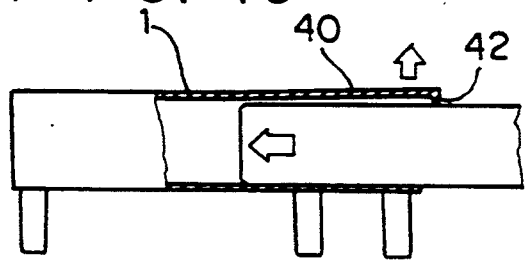
FIG. 46 is a detail of the module of FIG. 45 during insertion of a cassette and illustrating a cassette blocking element.
Figure 47:
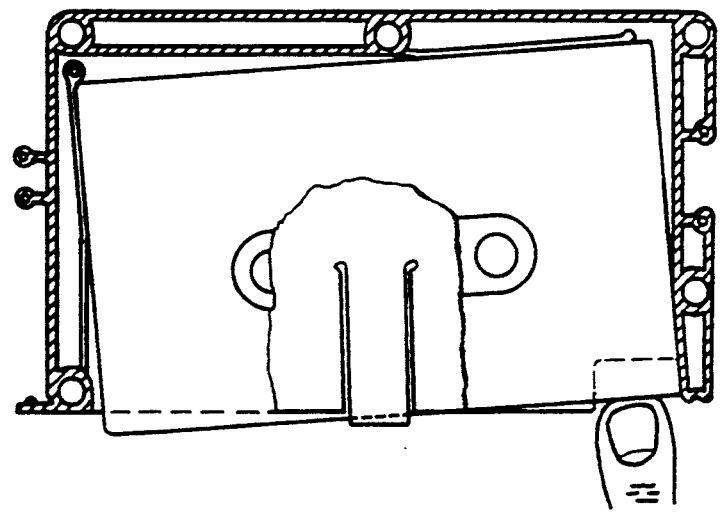
FIG. 47 is a view similar to that of FIG. 45 at the moment of ejection of the cassette.

FIGS. 45, 46 and 47 show an arrangement somewhat similar and equivalent to that of FIGS. 42 to 44. In this case half of the back wall 4 is as shown in FIG. 1 but, starting at the central coupling cylinder portion 13 the inner part of the wall is substituted by a spring element part 35 identical to part 35 of FIG. 42.

In addition the present embodiment has the springs 39 and the ridges 36 and 37 of the previous embodiment substituted by a single spring and cassette blocking element 40 which is formed by two slits 41 in top panel 1 of the housing. In addition, as seen in FIG. 46, the spring element 40 is provided with a front downwardly extending catch portion 42. When a cassette is inserted into the housing module, spring element 40 lifts slightly to permit its passage but when the position of total insertion is attained, the front edge of the cassette will be positioned slightly behind catch element 42 which will then fall with the spring to block the cassette in the housing.

Catch element 42 is formed laterally with cam faces in a manner somewhat similar to ridges 36 and 37 of the FIG. 42 to 44 embodiment. As a result, when withdrawal of the cassette is attempted using thumb pressure as shown in FIG. 47, the cassette will pivot and, as this happens, its front edge will ride along the left hand cam surface of catch element 42, causing it and spring 40 to rise which permits normal ejection of the cassette.

The right side (as seen in FIG. 47) of cam surface of catch 42 may be used to assist raising of the spring 40 when a cassette is being introduced into the housing module.

I claim:

1. A system for storing supports selected from containers for audio and video cassettes and laser discs, comprising support;
   a housing having an opening for the insertion and ejection of said support and defining an insertion direction;
   pivot means for said support within the housing and opposite said opening;
   said housing having a means for containing a said support in each of the following positions:
   a) a fully inserted position;
   b) a pivoted position which is turned through an angle determined by said pivot means in a first rotational direction with respect to said fully inserted position; and
   c) an ejection position which is turned from said pivoted position through substantially the same said angle in a second rotational direction opposite to said first rotational direction and displaced in a direction opposite to said insertion direction, relative to said fully inserted position;
   and elastic bias means in said housing adjacent a first side of said opening for performing the following functions in the following sequence:
   a) exerting on a said support which is in said fully inserted position a force which is substantially transverse to said insertion direction and is directed toward a second side of said housing which is opposite to said first side;
   b) yielding in response to movement of a said support from said fully inserted position to said pivoted position;
   c) exerting on a said support which is in said pivoted position, a force having a component in an ejection direction which is opposite to said insertion direction; and
   d) rotating a said support which is in said pivoted position in said second rotational direction to bring said support to said election position.

2. A system according to claim 1 wherein said housing includes a first module and a second module which is substantially similar to said first module and is attachable to said first module, said first module comprising a top panel of larger area and depending therefrom first and second side walls and a back wall contiguous with first ends of said side walls, each of said modules being a single part of molded plastic material and further being formed with first means for permitting connection to the other of said modules to provide a recording support cavity defined by (a) the top panel of said first module, (b) the top panel of said second module, (c) said first and second side walls of said first module, and (d) said back wall of said first module; said elastic bias means being located in said recording support cavity.

3. A system according to claim 2, wherein said first module is provided with second means for permitting lateral connection to similar modules.

4. A system according to claim 2, wherein, in each said back wall comprises a first part substantially normal to said insertion direction and a second part inclined away from said opening and said second side wall comprises a first part contiguous with said second part of the back wall and substantially parallel to said insertion direction and a second part ending at said opening and inclined away from said first side wall, said first and second parts of said back wall meeting each other at said pivot means.

5. A system according to claim 2, wherein said elastic means are formed as an integral part of said module.

6. A system according to claim 1, wherein said elastic bias means comprises a spring fixed to said housing at said first side and includes a spring blade portion aligned with said insertion curved toward said second side of said housing, said spring blade portion having a free end provided with a rounded protuberance which protrudes said second side of said housing.

7. An assembly for storing at least two recording supports selected from containers for magnetic tape cassettes and laser discs, comprising, at least two recording supports in combination with at least two housing modules, each said housing module being a single part of molded plastic material and comprising:
   a top substantially rectangular panel of larger area;
   first and second opposite side walls and a back wall depending from said top panel;
   releasable vertical snap connection means for permitting releasable vertical connection between said modules with one of said modules mounted above the other of said modules in a configuration in which said top panel of said other module serves as a bottom panel for said one module to define a recording support cavity having an insertion opening opposite said back wall of said one module and determining an insertion direction toward said back wall;
   pivot means for said support within the housing module and opposite said insertion opening;
   said recording support cavity having a means for containing a said support in each of the following positions:
   a) a fully inserted position;
   b) a pivoted position which is turned through an angle determined by said pivot means in a first rotational direction with respect to said fully inserted position; and
   c) an ejection position which is turned from said pivoted position through substantially the same said angle in a second rotational direction opposite to said first rotational direction and displaced in a direction opposite to said insertion direction, relative to said fully inserted position;
   and elastic bias means in said housing module on said first side wall for performing the following functions in the following sequence:
   a) exerting on a said support which is in said fully inserted position a force which is substantially transverse to said insertion direction and is directed toward said second side wall of said housing;
   b) yielding in response to movement of a said support from said fully inserted position to said pivoted position;
   c) exerting on a said support which is in said pivoted position, a force having a component in an ejection direction which is opposite to said insertion direction; and d) rotating a said support which is in said pivoted position in said second rotational direction to bring said support to said ejection position.

8. Assembly according to claim 7, wherein said releasable vertical connection means comprise a plurality of localized pin and socket type connection formations on each said module.

9. Assembly according to claim 7 wherein said first and second side walls of each said module are each provided with releasable external lateral snap connection means for permitting lateral snap connection between said modules and other modules similar thereto.

10. A system for storing supports selected from containers for audio and video cassettes and laser discs, comprising a support;
a housing having an opening for the insertion and ejection of said support and defining an insertion direction, said housing having a cavity having a back wall, a first side wall and a second side wall;
pivot means for said support within the housing and opposite said opening;
said housing having a means for containing a said support in each of the following positions:
 a) a fully inserted position;
 b) a pivoted position which is turned through an angle determined by said pivot means in a first direction with respect to said fully inserted position; and
 c) an ejection position which is turned from said pivoted position through substantially the same said angle in a second rotational direction opposite to said first rotational direction and displaced in a direction opposite to said insertion direction, relative to said fully inserted position;
elastic bias means in said cavity substantially parallel to the insertion direction and having a protrusion which protrudes from said elastic bias means toward said second side wall to catch a corner of said support and prevent its movement toward the rear wall when the support is at its pivoted position, said elastic bias means being operable for performing the following functions:
 (a) biasing the support against said second side wall when the support is in its fully inserted position; and
 (b) rotating the support in said second rotational direction when the support is in said pivoted position.

* * * * *